United States Patent
Davis et al.

(10) Patent No.: US 7,089,238 B1
(45) Date of Patent: Aug. 8, 2006

(54) METHOD AND APPARATUS FOR INCREMENTAL COMPUTATION OF THE ACCURACY OF A CATEGORIZATION-BY-EXAMPLE SYSTEM

(75) Inventors: Mark W. Davis, Tracy, CA (US); John Murphy, San Jose, CA (US); Clark Leonard Breyman, San Francisco, CA (US)

(73) Assignee: Inxight Software, Inc., Sunnyvale, CA (US)

( * ) Notice: Subject to any disclaimer, the term of this patent is extended or adjusted under 35 U.S.C. 154(b) by 654 days.

(21) Appl. No.: 09/893,301

(22) Filed: Jun. 27, 2001

(51) Int. Cl.
*G06F 17/30* (2006.01)
(52) U.S. Cl. ............................................. 707/5
(58) Field of Classification Search .................. 707/3, 707/5
See application file for complete search history.

(56) References Cited

U.S. PATENT DOCUMENTS 6,006,221 A * 12/1999 Liddy et al. ............... 707/5
6,122,628 A * 9/2000 Castelli et al. ............ 707/5

OTHER PUBLICATIONS

Arya, S. et al, "An Optimal Algorithm for Approsimate Nearest Neighbor Searching in Fixed Dimentions," Nov. 1998, Journal of the AMC vol. 45, No. 6, pp. 891-923.*

Cutting, D. R., et al. "Scatter/Gather: A Cluster-based Approach to Browsing Large Document Collections," Jun. 1992, Ann Int'l SIGIR '92 Denmark, pp. 318-329.*

Daniel P. Lopresti *A Comparison of Text-Based Methods for Detecting Duplication in Document Image Databases* Document Recognition and Retrieval VII (IS&T/SPIE Electronic Imaging 2000), Jan. 2000, San Jose, CA.

Narayanan Shivakumar and Hector Garcia-Molina *The SCAM Approach to Copy Detection in Digital Libraries* Department of Computer Science Stanford University Stanford, CA 94305 USA.

(Continued)

*Primary Examiner*—Jack M. Choules
(74) *Attorney, Agent, or Firm*—Ernest J. Beffel, Jr.; Haynes Beffel & Wolfeld LLP

(57) ABSTRACT

Disclosed are methods and for incrementally updating the accuracy provided by documents in training set of used for automatic categorization. A k-nearest neighbor database includes the documents in the training set, categories, category assignments of the documents and category scores for the documents. A list made up of the nearest neighbors of the documents and corresponding similarity scores contains is maintained by the method. On adding or deleting documents or category assignments, the documents influenced by the changed documents or category assignments are identified. The category scores of the identified documents are updated to be consistent for the updated training set and a new precision and recall curves are computed for the categories including updated category scores. The precision and recall curves may be used to determine an optimal number of documents to maximize the return of relevant documents while minimizing the total number of documents.

10 Claims, 6 Drawing Sheets

OTHER PUBLICATIONS

William B. Frakes and Ricardo Baeza-Yates *Information Retrieval Data Structures & Algorithms* pp. 19-71.

Ian H. Witten et al. *Managing Gigabytes Compressing and Indexing Documents and Images* pp. 181-188.

Fazli Can et al. *A Dynamic Cluster Maintenance System for Information Retrieval* SIGIR 1987 pp. 123-131.

Fazli Can et al. *Concepts of the Cover Coefficient-Based Clustering Methodology* SIGIR 1985 pp. 204-211.

* cited by examiner

```
<!DOCTYPE registerDoc [
    <!ELEMENT collection (textitem+)>  —301           302
    <!ELEMENT textitem ((file|text), categories+)>
    <!ATT LIST textitem
        extid ID #REQUIRED
        date CDATA #REQUIRED>
    <!ELEMENT text (#PCDATA)>  —303
    <!ELEMENT file EMPTY>  —304
    <!ATT LIST file
        location CDATA #REQUIRED>
    <!ELEMENT categories (codeclass+)>  —305
    <!ELEMENT codeclass (code+)>  —306
    <!ATT LIST codeset
        extid CDATA #REQUIRED>
    <!ELEMENT code EMPTY>  —307
    <!ATT LIST code
        extid CDATA #REQUIRED
        date CDATA #REQUIRED>
]>
```

FIG. 3A

```
<?xml version="1.0" encoding="ISO8859-1"?>
<collection>  —301
    <textitem extid="ddd" date="2001-05-29">  —302
        <text>  —303
        This is the text that Categorizer will
        use when identifying examples to assist
        it in classification of new documents.
        </text>
        <categories>  —305
                                                      307
            <codeclass extid="main">  —306
                <code extid="X1" date="2001-05-29T15:34z"/>
            </codeclass>
        </categories>
    </textitem>
</collection>
```

METHOD AND APPARATUS FOR INCREMENTAL COMPUTATION OF THE ACCURACY OF A CATEGORIZATION-BY-EXAMPLE SYSTEM

BACKGROUND OF THE INVENTION

Training sets are used in automatic categorization of documents, to establish precision and recall curves and to train automatic categorization engines to categorized documents correctly. Precision and recall curves are standard measures of effective categorization and information retrieval. Precision is a measure of the proportion of documents retrieved that are relevant to the intended result. Recall is a measure of the coverage of a query, for instance the number of documents retrieved that match an intended result, compared to the number of documents available that match the intended result. To construct a training set for automatic categorization, trained professionals exercise nearest neighbor and similarity measure procedures, then use precision and recall curves to set criteria for automatically assigning documents to categories, using the training set to generate the precision and recall curves. The training set typically includes documents with categories that have been editorially established or verified by a human.

Errors in categorization include failure to assign a document to the category in which it belongs and assignment of the document to a category in which it does not belong. One cause of this type of error is so-called inadequate corroborative evidence of the correct categorization of similar documents. In other words, the training set does not include similar enough documents to produce the desired match. An approach to overcoming inadequate corroborative evidence is to add documents to the training set.

Adding documents to or deleting documents from a training set implies generating new precision and recall curves, which are used to retune automatic categorization criteria. One way of updating a training set is to generate category scores for each member of the training set using the same categorization algorithm that is used for automatic assignment of documents that have not been editorially categorized. These scores are stored with an editorial category assignment indictor in persistent storage. Data associated with a score entry includes the document identifier, the category identifier, the category score, and a Boolean value indicating whether the same category was editorially assigned to the document. This data is then used to generate precision and recall curves for each category. The curves are analyzed and thresholds adjusted as appropriate. Once the training set has been retuned, it can be used for categorization of documents.

Updating a large training set to add a few documents, for instance to provide additional evidence supporting a particular categorization, can be time consuming and computationally taxing, when the nearest neighbors and similarity scores are recomputed and category thresholds are adjusted for the entire training set. Therefore, there is an opportunity to improve on training set updating by incremental updating.

SUMMARY OF THE INVENTION

The present invention includes a method and device for incremental updating of a training set of documents used for automatic categorization. Particular aspects of the present invention are described in the claims, specification and drawings.

BRIEF DESCRIPTION OF THE DRAWINGS

FIG. 3 is a flow diagram for duplicate elimination when documents are first added to a set.

FIG. 5 is a user interface for responding to duplicate indications.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Figure 1:
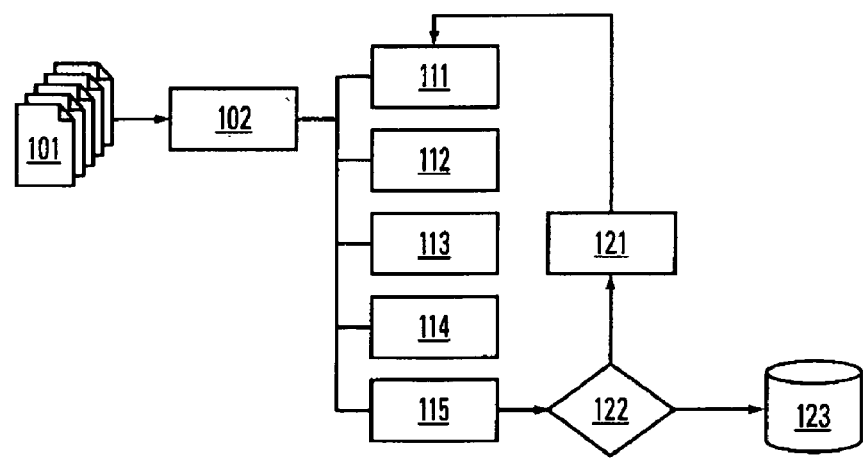
FIG. 1 is a flow diagram for adding documents to a set.

FIG. 1 is a block diagram of creating an initial set of documents. In this context, a document generically may include text, images, recordings, and other data sets. Text documents may include visual formatting information, as in HTML, RTF, typeset or other formats, or they may not. Uncoded documents 101 are loaded and registered 102 into a workfile. A user codes the documents to create a training set. The user may begin with a set of topics and add or delete topics 111 to the topic taxonomy. Individual documents can have topic assignments added or removed 112. New documents can be added or deleted 113, to supplement or reduce the uncoded documents set 101. Nearest neighbor and similarity measures can be generated 114. Precision and accuracy curves can be generated, reviewed and acted upon 115. The user may chose 121, after setting or verifying the thresholds for categorization, to refine the training set workfile 122 or to save the workfile as a training set 123.

Figure 2:
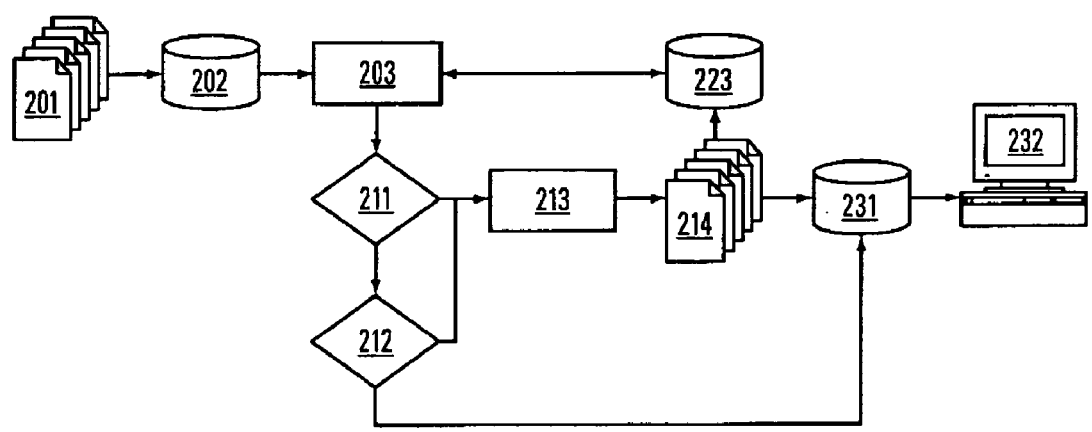
FIG. 2 illustrates nearest neighbor and feature vector concepts.

FIG. 2 is a block diagram of adding documents to an established training set. The documents 201 may be coded or uncoded. An input queue 202 may be used to organize addition of documents 201 to the training set, for instance, when a news dissemination service is receiving documents from multiple feeds and selecting a portion of them to add to the training set used in production for automatic classification of incoming documents. A categorization engine 211 is used to identify nearest neighbors and calculate similarity and category scores. The category score is higher or lower, corresponding to a degree of confidence in assignment of a particular document to a particular category. A threshold is used by the system 211 to pass automatically categorized documents 212 or to refer them for editorial review 213. Documents verified by editorial review are collected in a verified documents set 214 and used for incremental updating of the training set 223. Editorial review, for quality control or other purposes, may also include a random sample 212 of documents that were above a confidence threshold during coding. Selection of a random sample 212 for editorial review balances addition to the training set of difficult cases, with low confidence scores, and easier cases, with higher confidence scores. Editorially reviewed and passed documents are added to an output queue 215, for addition to a set of coded documents 231, which are available for searching by users 232.

FIGS. 3A–B depict an input file format for an individual document, which may be coded or uncoded. For editorially coded or editorially verified documents, the input format may be slightly modified to add a flag field indicating that the document was coded or verified by a human. FIG. 3A is a document type definition ("DTD") defining an input format. A DTD is a type of file associated with SGML and XML documents that defines how the markup tags should be interpreted by the application presenting the document. The HTML specification that defines how Web pages should be displayed by Web browsers is one example of a DTD. This DTD is for an XML-structured file. XML is one convenient form of input file layout. Other fixed and variable formats may also be used to practice the present invention. The collection element 301 serves as the root element for document type registerDoc and contains the textitem elements, which correspond to the training documents. The textitem element 302 specifies the training documents' text and categorization information. The textitem element may include two attributes: Extid is an external identifier, which uniquely names a document in a training set; and date is a date on which the document was created. One allowable format for the data is "yyyy-mm-dd". The text element 303 may contain a document's text. If a document contains tags similar to XML tags, the text may be placed inside XML CDATA marks. For instance, <text><! [CDATA[
      <P> We will need the following items
      for a camping trip: <UL>
      <LI>backpacks<LI>boots . . .
      </UL>
    ]]></text>

The file element 304 specifies an external file, which contains the text of a particular training document. If desired, the external file may store the document text using a different file format then used for the training documents that. The location attribute is the location the file containing the document text. The categories element 305 contains the entire list of topics pertaining to document. Assignment of the document to a category or the lack of assignment of the document to the category is used is evidence that a topic code applies or does not apply. The element code class 306 contains list of topic code elements longing to a specific code class, or name space. Code classes provide a mechanism for managing a taxonomy in which several codes have the same external identifier but different semantics. For example, a taxonomy can contain two topics named "football", one in the "American sports" code class in the other in the "international sports" code class. The "football" topic code may effectively be applied to two different sports. The code class element 306 may contain the attribute extid, an external identifier that uniquely names the code class in the taxonomy. The code element 307 specifies one of training document's topic codes. The code element 307 may include two attributes: Extid is an external identifier, which uniquely names a document in a training set; and date is a date on which the document was created. FIG. 3B is an example of applying the DTD illustrated in FIG. 3A.

Figure 4:
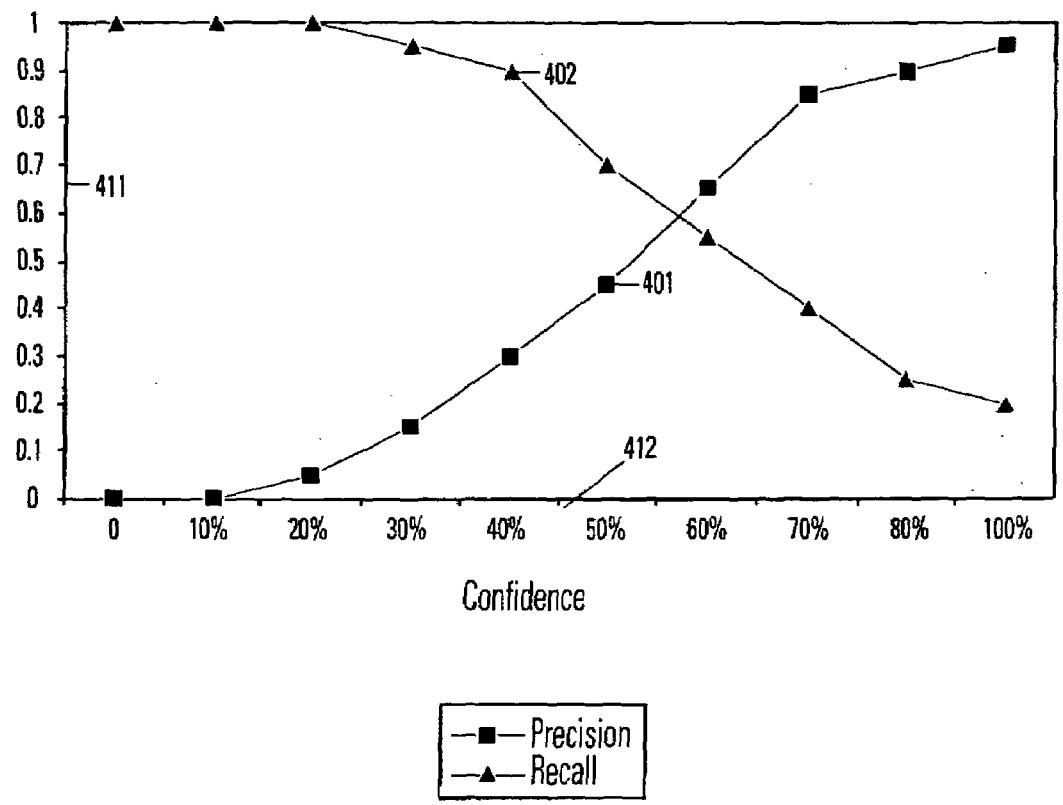
FIG. 4 is a flow diagram for duplicate elimination when documents are tested before addition to a set.

FIG. 4 depicts a pair of precision and recall curves. Precision is standard measure of information retrieval performance. It is defined as the number of relevant documents retrieved divided by the total number of documents retrieved. For example, suppose that there are 80 documents relevant to widgets in the collection. A retrieval system returns 60 documents, 40 of which are about widgets. The system's precision is $^{40}/_{60}$=67 percent. In an ideal world, precision is 100 percent. Since this is easy to achieve (by returning just one document,) the system attempts to maximize both precision and recall simultaneously. Recall is another standard measure of performance, defined as the number of relevant documents retrieved divided by the total number of relevant documents in the collection. For example, suppose that there are 80 documents relevant to widgets in the collection. The system returns 60 documents, 40 of which are about widgets. Then the system's recall is $^{40}/_{80}$=50 percent. In an ideal world, recall is 100 percent. However, since this is trivial to achieve (by retrieving all of the documents,) the system is measured by both precision and recall. One standard way of plotting these curves is to determine thresholds that recall 0, 10, 20 . . . 100 percent of the relevant documents in the collection. The recall curve 402 is plotted at such varying degrees of recall, expressed as a percentage 412. At each threshold for recall, the precision score 411 is also calculated, expressed as a fraction 411. This pair of curves illustrates that as recall increases, precision tends to drop. The two are inversely related, but not precisely related. The choice of appropriate parameters or thresholds to trade-off precision and recall depends on the shape of precision and recall curves for a particular topic and the preferences of the user community, as interpreted by a database manager.

Figure 5A:
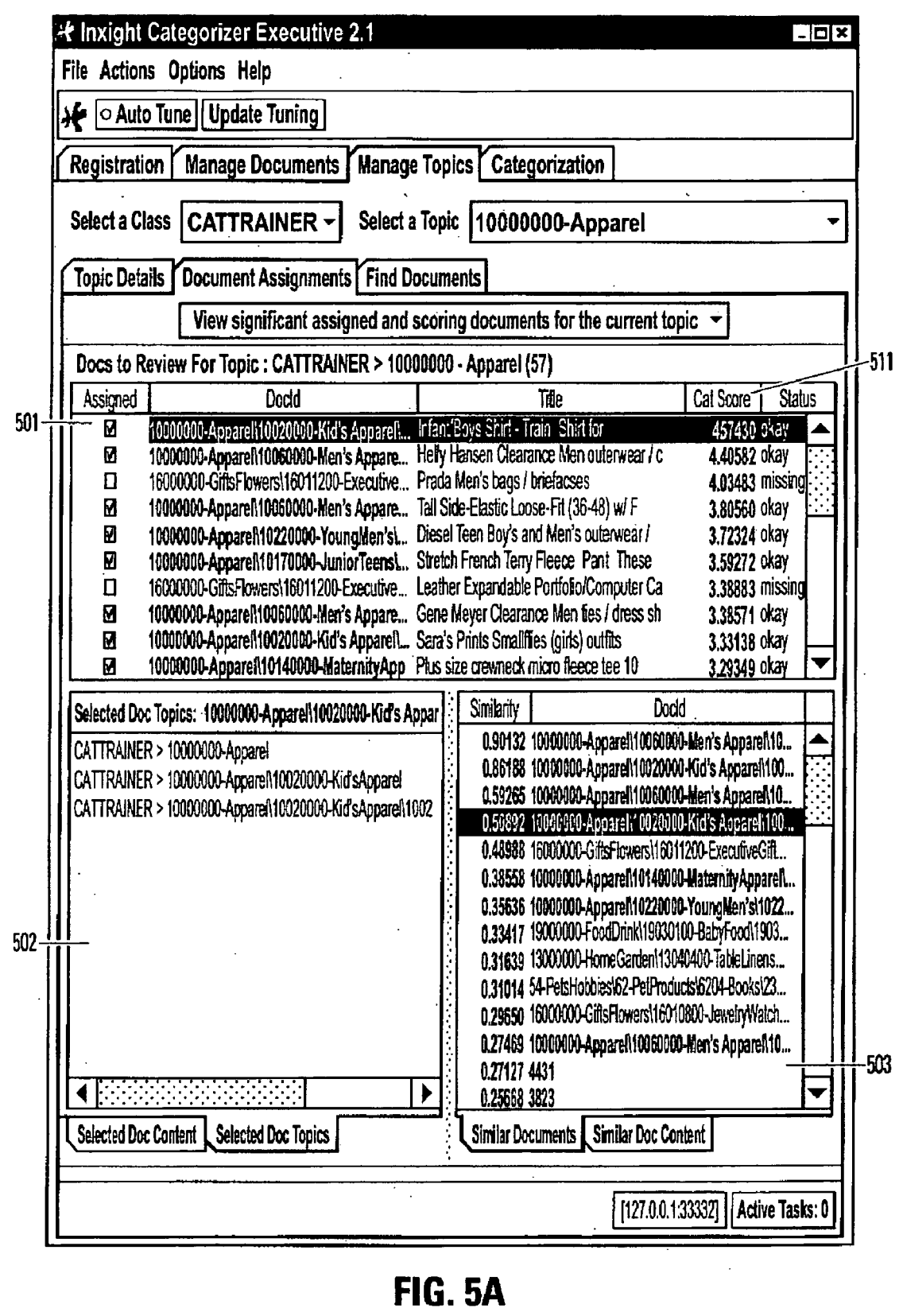
Figure 5B:
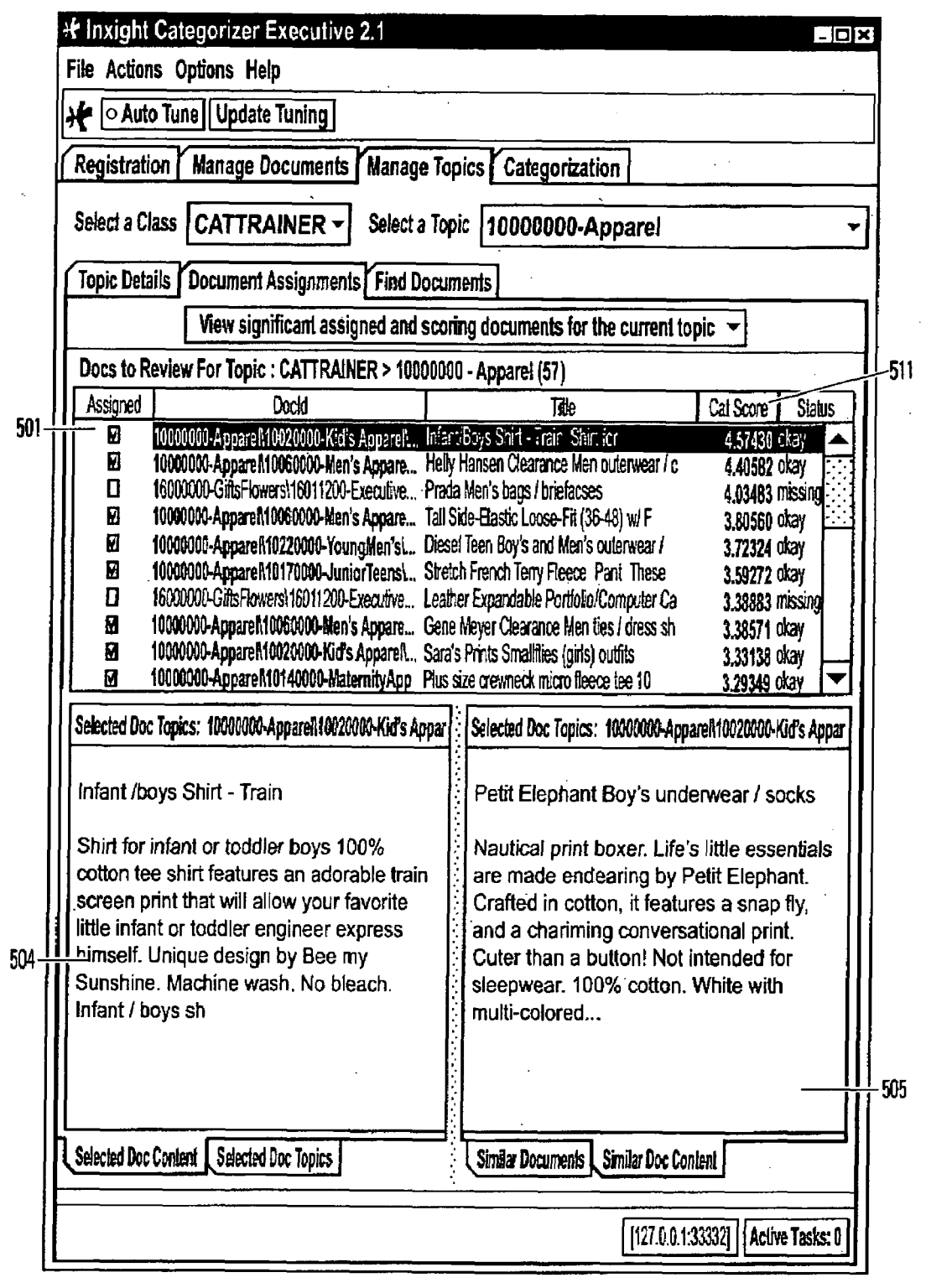

The database manager uses various tools to establish and maintain a training set. The FIGS. 5A–B depict an interface in which documents for review are arranged according to a selected topic. The documents to review panel 501 is the same in FIGS. 5A–B. A list of documents having high category scores is displayed, organized by the descending category score 511. The category score for a particular document is the sum of similarity scores for the k nearest neighbors (similar documents) also assigned to the topic or category of interest. Category scores may be color coded for emphasis, such as assigning: green to documents above a high confidence cutoff; gold to documents between the high confidence cutoff and a low confidence cutoff; and maroon for documents below a low confidence cutoff. The assigned checkbox column allows a user to see which documents have been assigned to a category and may allow the user to change their assignment status. The doc id column identifies the document, and may emphasize documents that have not been tuned recently. The title column contains a descriptive title. The status column provides information regarding confidence in coding of a document. "Okay" may be used to indicate that a document has been correctly categorized; "missing" may be used to indicate that a document with a high score has not been assigned to a topic; and "suspicious" may indicate that a document with a low score has been assigned to the topic. "Missing" and "suspicious" documents may be referred to a human for editorial review.

The selected document panel 502 provides information regarding the selected document, which is highlighted in the documents to review panel 501. The information provided depends on whether the selected document topics or content tab has been activated. FIG. 5A is an example of information about selected document topics. FIG. 5B is an example of selected document content. In the selected document topics tab view, the system displays topics associated with the selected document. In the selected document content view, the system displays the content of the selected document.

The similar document window 503 provides information about documents similar to the selected document. For k nearest neighbor coding, this panel provides access to nearest neighbors of record. In FIG. 5A, the similar document window 503 displays the similar documents list view. In this view, the similarity column displays a similarity score, which reflects the similarity of the listed documents to the selected document. The doc id column identifies each of the documents in the list. Document identifiers may be coded to indicate which of the similar documents are assigned to the topic or category of interest. In FIG. 5B, the similar document window displays the similar document content view. The content of the document highlighted in the similar documents list view is displayed. A keystroke or command or switching views to highlight a different document from the list of similar documents can be used to view the content of another similar document.

Figure 6:
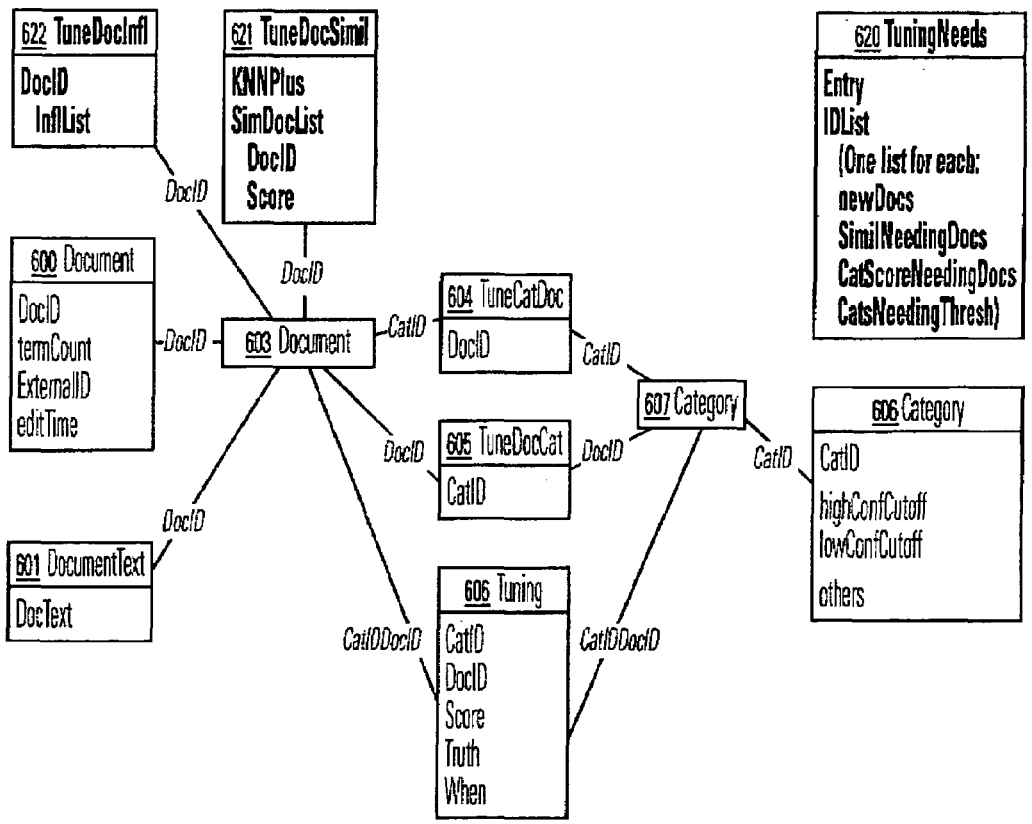
FIG. 6 is a more detailed flow chart of duplicate detection.

FIG. 6 is a schema for a database suitable to incremental updating. This schema can be implemented using a variety of database models, such as a relational, network or hierarchical database. It also can be implemented using ISAM, VSAM or other indexed flat files. Two basic entities of this schema are documents 603 and categories 607. A document is associated with information that may be stored in two tables, document 600 and document text 601. These tables may be kept separate, segregating types of data, or they may be combined. The document table 604 includes a DocID, which serves as a linking field, a termCount, which is a term vector representing the content of the document, optionally stored in a highly compressed format, and additional fields that are not important for the present invention. The document text table 601 contains the document text. An additional document-related table, TuneDocSimil 621 contains data useful to practicing the present invention and is described below.

A category 607 is associated with a variety of data in one or more category tables 608. A wide variety of useful information can be maintained for the category, but the information is not directly relevant to the present invention.

Several tables cross-link documents and categories. The TuneCatDoc 604 and TuneDocCat 605 tables cross-reference categories by document and documents by category, supporting an n to m relationship between documents 603 and categories 607. The tuning table 606 is organized by CatID and DocID. The data stored in this table is the category score and "truth", which means whether or not the document has been editorially assigned to the category. Editorial assignments may, of course, be at odds with automated assignments.

Figure 7:
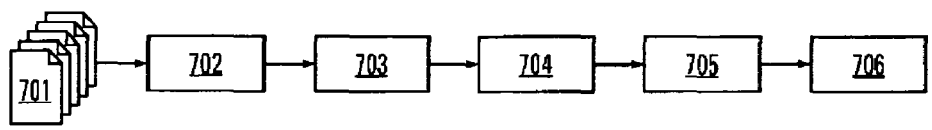
FIG. 7 depicts registering documents in a training set.

From the tables discussed above, the process of registering documents in a training set can be revisited by reference to FIG. 7, this time for a training set of coded documents. A coded document 701 is received 702. A term vector (termCount in table 600) is created. The text of the document is stored in a table 601. When the training set has been loaded, term vectors of training set documents are compared to generate similarity scores 703. Many different measures of similarity can be practiced in accordance with the present invention; the present invention does not depend on the similarity measure used. From the similarity scores, k nearest neighbor similar document lists can be created for the documents 704, where k is a parameter set for the number nearest neighbors to process. Category scores (stored in table 606) are calculated, based on the nearest neighbors and editorial assignments 705. Next, precision and recall curves are constructed 705, using the nearest neighbor data. Category assignment thresholds are established 706 by analysis of the curves. This may be a manual or automatic process; the threshold setting process is not important to the present invention. Workfiles and data used to compile the curves and to set the thresholds are erased in the normal course of processing, or at least not reused. If documents are added to or deleted from the training set database, the nearest neighbors are reevaluated, similarity scores, curves and category scores recalculated, and adjustment of the category assignment thresholds is at least considered. Substantial effort is involved in updating the entire training set database.

In accordance with the present invention, additional data is stored to facilitate incremental updating. The Tuning-Needs table 120 supports starting and stopping the incremental updating process, before completion. The TuneDocSimil table 121 retains some of the data otherwise lost when workfiles are erased. The TuneDoceInfl table 122 supports an alternative embodiment of the present invention.

The Tuning Needs table 120 maintains lists of incomplete updating tasks, assembled as or after documents have been added. A list of documents (newDocs) is maintained. A list of similar documents needing evaluation (SimilNeeding Docs) is compiled. A list of category scores needing adjustment is compiled. And a list of categories needing reevaluation of assignment thresholds is compiled. As incremental updating proceeds, completion of tasks for items on the list can be recorded, so that the incremental updating can be resumed without being restarted. Preferably, updating is restarted between processes, such as after registration and before calculation of similarity scores, or after calculation of similarity scores and before updating of nearest neighbors. Processing can be restarted between any two steps in the process of incremental updating, or within a step of incremental updating.

The TuneDocSimil table 121 includes data to support a first embodiment of the present invention. This table retains part of the similarity data compiled in the original compilation of the training set database. For the k nearest neighbors of the document 103, which are used in calculating curves or setting category assignment thresholds, the SiniDocList part of the TuneDocSimil table 121 includes a document identifier (DocID) and a similarity score (Score.). Again, at least some of this information would not ordinarily be retained in a training set database. TuneDocSimil 121 further includes the same information for an additional set (KNNPlus) of nearest neighbors beyond the "k", for a total of "m" nearest neighbors. In a first embodiment of a process practicing aspects of the present invention, the m nearest neighbors serve as a proxy for documents influenced by addition or deletion of a document or a category assignment. The "k+1" through "m" nearest neighbors also may supply a population from which deleted members of the k nearest neighbors set can be replenished.

The TuneDocInfl table 122 retains information about influenced documents that consider document 103 to be within their neighborhood. As illustrated in FIG. 2, relationships among neighbors are not symmetrical. Depending on spacing in the neighborhood A-B-C, B may be the nearest neighbor of A and C may be the nearest neighbor of B. Then, B is A's NN, but A is not B's NN.

Aspects of the present invention reduce the amount of computing necessary to retune a database after documents or category assignments are added to or deleted from the database. Maintenance of one or more additional sets of data facilitate incremental updating with the reduced amount of computing. Retaining lists of k nearest neighbors and corresponding similarity scores, derived in the process of identifying the k nearest neighbors, is useful for updating a training set database. The list of k nearest neighbors and corresponding similarity scores typically exist in work files that are deleted to save storage after a k nearest neighbors database is built. Further, retaining a list of m nearest neighbors and corresponding similarity scores is useful both as a proxy for documents influenced by a particular document and for replacing a deleted document, without recomputing nearest neighbor relationships. The value m is greater than the value k, by a reasonable factor such as 1.25, 1.5, 1.75, 2.0 or in any range between those factors. The value m may be chosen to trade-off record storage and the use of an extended neighborhood as a proxy for documents influenced by a particular document.

As described in the context of the influenced document table 622, a document influenced by a particular document is a document which adds the particular document on its list of k nearest neighbors. When m is sufficiently larger than k, the lack of symmetry in nearest neighbor relationships is practically overcome by the extended reach of the neighborhood.

A useful principle for incremental updating is to retain information regarding documents influenced by a particular document, instead of throwing it away after computing k nearest neighbor relationships. Operationally, computing k nearest neighbor relationships may include calculating similarity among all pairings of documents in a training set and selecting the highest-ranking similarity scores, for instance by sorting the scores, to determine the k nearest neighbors of a particular document. At the time the k nearest neighbors are determined, the list of k nearest neighbors and corresponding similarity scores exist. A list of m nearest neighbors and corresponding similarity scores is easily derived. The information is available from which a list of documents influenced by a particular document can be assembled. This may be a list of k or m documents potentially influenced by the particular document, or any other length of list, preferably including at least k documents. For a list including more than k documents, ranking or list ordering may be utilized to identify the order of candidacy for a particular document to influence another document, should intervening documents be deleted from the training set.

Four cases can be used to illustrate incremental updating: adding or deleting a category assignment or a whole document. The process is similar for use of an extended neighborhood and for use of a list of influenced documents. Consider the case of incrementally adding category assignments. Category assignments may be added to one or more documents originally found in a k nearest neighbors database. One or more category assignments may be added to a particular original document. The database typically may include the original documents, categories, category assignments for the documents, and category scores for the original documents. These category scores may be retained only for categories to which documents are assigned or may be retained for all categories to which a document may be assigned. Substantial additional information also may be maintained by k nearest neighbors database, but that additional information may not be of any use in incrementally adding category assignments. A process of incrementally adding category assignments may begin when the k nearest neighbors database is built, with retaining at least part of the information used to build k nearest neighbors lists. In particular, lists of m nearest neighbors of each particular document in the database, together with corresponding similarity scores, may be retained in any useful data structure, such as an ISAM file or a mNN table. The information retained may be considered a first list of the k nearest neighbors of original documents in the database plus an additional list of m–k additional nearest neighbors. Or, alternatively, it may be considered a single list. The two share the characteristic that an extended neighborhood is maintained, beyond the neighborhood used for calculating category scores. Adding one or more new category assignments for one or more particular original documents is part of the process. These category assignments may be added editorially, by a human, or automatically, either with or without verification by a human. In this first embodiment, a predetermined number of nearest neighbors have their the category scores recomputed, as a proxy for recomputing the category scores of those original documents influenced by adding one or more category assignments to one or more particular documents. The predetermined number of documents may be expressed as k*z, where is is greater than 1 and the product k*z is less than or equal to the number of nearest neighbors in the extended neighborhood of nearest neighbors, namely m. Stated differently, 1<=z<=m/k. Preferably, z is large enough that the product serves as a fair proxy for the documents influenced. The category scores of the particular original documents to which category assignments were added also need to be calculated. One useful calculation of category scores is the sum of similarity scores, however calculated, for those k nearest neighbors of a particular document which have category assignments to the category of interest. Once category scores been calculated, precision and recall curves can be computed. These precision and recall curves may be based on any number or spacing of recall percentages. For instance, an 11 point recall curve is plotted by determining category scores at which 0, 10, 20 . . . 100 percent recall is accomplished. Precision scores are calculated for the same points on the curve. Most generally, precision and recall curves are used in this context to refer to measurements of information retrieval that can subsequently be balanced in setting category assignment thresholds. The setting of category assignment thresholds is not necessary to practicing the present invention.

A second embodiment of adding a category assignment to an existing document utilizes an influence list. The influence list identifies original documents that have a particular original document among their k nearest neighbors. This embodiment begins with the same sort of k nearest neighbors database, including original documents, categories, category assignments for the documents, and category scores for the original documents. At the creation of the k nearest neighbors database, lists of k nearest neighbors and corresponding similarity scores are retained for the original documents. In this embodiment, it is optional to retain a list of additional nearest neighbors forming an extended neighborhood, because documents are added, not deleted from the database by this process. The extended neighborhood is not needed to replenish the list of k nearest neighbors. Either at the creation of the k nearest neighbors database or some time thereafter, an influence list is created. One or more category assignments are added to one or more particular original documents. A plurality of category assignments may be added to the same original document. With new category assignments in place, category scores are computed for the documents to which categories have been added and for other original documents influenced by the documents to which categories are added. The influenced documents can be identified by reference to the influence list. Category scores only need to be computed for those categories to which new category assignments are added. Virtually any form of similarity score can be used, including a sum of similarity scores for nearest neighbors having category assignments in the category of interest. With category scores computed, precision and recall curves also can be computed.

Adding one or more documents to the k nearest neighbors database is more involved than adding categories to existing documents. Both the document and the categories need to be added. One embodiment of adding documents and category assignments begins with the same sort of k nearest neighbors database, including original documents, categories, category assignments for the documents, and category scores for the original documents. At the creation of the k nearest neighbors database, lists of k nearest neighbors and corresponding similarity scores are retained for the original documents. In an extended neighborhood, the m nearest neighbors of original documents in the database and corresponding similarity scores may be retained in any useful data structure. In this embodiment, the extended neighborhood serves as a proxy for influenced documents. One or more documents are added to the database, before category assignments can be added. The former after the category assignments are added, similarity scores are calculated between the added documents, in the added and original documents. The one or more lists of m nearest neighbors are modified. A predetermined number of nearest neighbors of the added documents are updated or modified. The similarity scores may be a basis for updating the nearest neighbor list. Category assignments are added for the new documents. Category scores are computed for both the added documents and the predetermined number of nearest neighbors of the added documents. Only the categories affected by addition of a document and category scores need to be computed. This includes categories to which category assignments are added. It also includes categories that are impacted by changes in the k nearest neighbors lists. When a document is added to the database, it may become a nearest neighbor of an original document, displacing some other nearest neighbor. The categories to which the displaced nearest neighbor was assigned are impacted by the addition of the document. The retained similarity scores may be used in computing the category scores. From the category scores, precision and recall curves can be computed.

A second embodiment of adding new documents and category assignments to the database utilizes an influence list. It tracks the processing of adding a category, to the point that a new document is added to the database and at various points thereafter. The influence list identifies original documents that have a particular original document among their k nearest neighbors. This embodiment begins with the same sort of k nearest neighbors database, including original documents, categories, category assignments for the documents, and category scores for the original documents. At the creation of the k nearest neighbors database, lists of k nearest neighbors and corresponding similarity scores are retained for the original documents. In this embodiment, it is optional to retain a list of additional nearest neighbors forming an extended neighborhood, because documents are added, not deleted from the database by this process. The extended neighborhood is not needed to replenish the list of k nearest neighbors. Either at the creation of the k nearest neighbors database or some time thereafter, an influence list is created. This process of adding new documents and category assignments involves adding one or more new documents to the database. For the new documents, similarity scores are calculated between particular documents and the whole set including both new and original documents. Using the calculated similarity scores, the k nearest neighbors lists are updated to include the new documents. This may involve both creating k nearest neighbors lists for each of the new documents and updating the k nearest neighbors lists of the original documents. Optionally, the influence list can be updated to include new documents. The updating of the influence list may not need to be done each time new documents are added. For the new documents, category assignments are added. Category scores are computed for both the new and original documents influenced by the new category assignments, including categories influenced by changes in the k nearest neighbors lists resulting from addition of one or more documents to the database. Precision and recall curves can be computed from the new category scores.

A further aspect of the present invention is a method of deleting category assignments for particular documents in a k nearest neighbor database. As the other methods, the database may include original documents, categories, category assignments for the documents, and category scores for the original documents. Again, the method may include retaining lists of k or m nearest neighbors and corresponding similarity scores. The method involves of deleting one or more category assignments for one or more particular original documents in the database. Category scores are computed for the particular original documents from which category assignments have been deleted and also for a predetermined number of nearest neighbors of the particular original documents. The predetermined number of nearest neighbors serves as a proxy for documents influenced by deletion of the category assignment. Category scores only need to be computed for those categories from which category assignments are deleted. The similarity scores kept with the k nearest neighbors lists can be used to compute the category scores. Precision and recall curves can be computed from the category scores. Only the precision and recall curves for the categories from which category assignments are deleted need to be computed.

A second embodiment of deleting a category assignment from an existing document utilizes an influence list. This embodiment is similar to the second embodiment of adding a category assignment to an existing document. The influence list identifies original documents that have a particular original document among their k nearest neighbors. This embodiment begins with the same sort of k nearest neighbors database, including original documents, categories, category assignments for the documents, and category scores for the original documents. At the creation the k nearest neighbors database, lists of k nearest neighbors and corresponding similarity scores are retained for the original documents. In this embodiment, it is optional to retain a list of additional nearest neighbors forming an extended neighborhood, because only category assignments, not documents, are deleted from the database. Either at the creation of the k nearest neighbors database or some time thereafter, an influence list is created. One or more category assignments are deleted from one or more particular original documents. A plurality of category assignments may be deleted from the same original document. With revised category assignments in place, category scores are computed for the documents, from which categories have been deleted, and for other original documents influenced by the documents from which categories are deleted. The influenced documents can be identified by reference to the influence list. Category scores only need to be computed for those categories from which category assignments have been deleted. Virtually any form of similarity score can be used to compute category scores, including a sum of similarity scores for nearest neighbors having category assignments in the category of interest. With category scores computed, precision and recall curves also can be computed.

Delete one or more documents from a k nearest neighbors database, along with their category assignments, varies from adding documents, in than an extended neighborhood of additional nearest neighbors and corresponding similarity scores are maintained, available to replenish the deleted documents. One or more lists including m nearest neighbors and corresponding similarity scores are retained from creation of the k nearest neighbors database. One or more of the original documents in the database and its corresponding category assignments are deleted. The deleted documents are further deleted from the one or more lists of m nearest neighbors for a predetermined number of nearest neighbors of the deleted documents. The predetermined number of nearest neighbors may be selected as a proxy for documents influenced by deletion of the deleted documents and their category assignments. Category scores may be computed for the predetermined number of nearest neighbors of the deleted documents. Only the categories affected by deleting a document and its category scores need to be computed. This includes categories from which category assignments were deleted. It also includes categories that are impacted by changes in the k nearest neighbors lists. When a document is deleted from the database, another document replaces it as a nearest neighbor of an various documents. The categories to which the replacement nearest neighbors are assigned are impacted by the deletion of the document. Similarity scores may be used to compute the category scores. Precision and recall curves may be computed from the category scores. The precision and recall curves only need to be computed for the categories in which the deleted documents had category assignments.

The alternative embodiment of deleting documents and their category assignments involves use of an influence list. The relationship of this second embodiment with the first embodiment parallels similar relationships for other aspects of the present invention. This embodiment begins with the same sort of k nearest neighbors database as the others. As in the first embodiment of deleting a document and its category assignments, one or more lists of m nearest neighbors and corresponding similarity scores are retained and an influence list is created. One or more documents are deleted from the database together with their corresponding category assignments. The one or more lists of m nearest neighbors are updated to delete the deleted documents. The influence list also is updated to delete the deleted documents. Category scores are computed for the documents influenced by deletion of documents and their category assignments. Only the categories influenced by the deleted documents need to be recomputed. These include documents in which in the deleted documents had category assignments and categories in which replacement documents have category assignments. Precision and recall curves can be computed from the category scores.

From the four particular cases and their alternative embodiments, more general descriptions of aspects of the present invention are apparent. One aspect is a method of incrementally updating precision and recall curves in a k nearest neighbors database, the database including original documents, categories, category assignments for the original documents, and category scores for the original documents. The method and includes retaining for the original documents a list of their m nearest neighbors and corresponding similarity scores. The number of neighbors m is greater than k, supplying an extended neighborhood. One or more original documents can be either added or deleted. Adding or deleting the documents implies that category assignments also are added or deleted. The documents influenced by the addition or deletion of documents can readily be identified, for instance by using an influence list or by reference to the list of m nearest neighbors. One or more category scores of the influenced documents can be updated. The categories to which category assignments have been added or deleted need updated category scores. Additional categories also may be influenced. It may be convenient to update all of the category scores for the influenced documents. Then, precision and recall curves can be calculated or all the categories that have updated category scores. For categories in which the category scores did not change, is unnecessary to update the precision and recall curves.

Another aspect of the present invention is a method of incrementally updating precision and recall curves when category assignments, but not documents, have been added or deleted to k nearest neighbors database. The database may include original documents, categories, category assignments for the original documents, and category scores for the original documents. The method and includes retaining for the original documents a list of their m nearest neighbors and corresponding similarity scores. The number of neighbors m is greater than k, supplying an extended neighborhood. One or more category assignments can be either added or deleted from one or more original documents. The documents to which the category assignments are added or deleted are influenced by the addition or deletion of category assignments. The category scores of the documents influenced are updated, for at least the categories to which category assignments have been added or deleted. Precision and recall curves are computed for the categories having updated category scores.

While the preceding examples are cast in terms of a method, devices and systems employing this method are easily understood. A magnetic memory containing a program capable of practicing the claimed method is one such device. A computer system having memory loaded with a program practicing the claimed method is another such device.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

We claim:

1. A computer-implemented method of incrementally updating precision and recall curves in a k nearest neighbor database, said database including original documents, categories, category assignments for the original documents, and category scores for the original documents, the method including:

retaining for the original documents a list of their m nearest neighbors and corresponding similarity scores, wherein m>k;

adding or deleting one or more original documents and their category assignments;

identifying the documents influenced by the adding or deleting;

updating one or more category scores of the influenced documents; and computing precision and recall curves for the categories having updated category scores.

2. A computer-implemented method of incrementally updating precision and recall curves in a k nearest neighbor database, said database including original documents, categories, category assignments for the original documents, and category scores for the original documents, the method including:

retaining for the original documents a list of their m nearest neighbors and corresponding similarity scores, wherein m>k;

adding or deleting one or more category assignments to one or more original documents;

updating category scores of the documents influenced by the adding or deleting of one or more category assignments, for at least the categories to which the category assignments were added or deleted; and computing precision and recall curves for the categories having updated category scores.

3. A computer-implemented method of incrementally adding category assignments to particular original documents in a k nearest neighbor database, said database including original documents, categories, category assignments for the original documents, and category scores for the original documents, the method including:

retaining for the original documents a first list of their k nearest neighbors and corresponding similarity scores;

retaining for the original documents a second list of m–k additional nearest neighbors and corresponding similarity scores;

adding one or more category assignments for one or more particular original documents;

computing category scores for the particular original documents and a predetermined number of nearest neighbors of the particular original documents, for those categories to which the category assignments are added, based on the retained similarity scores; and computing precision and recall curves for the categories to which the category assignments are added.

4. A computer-implemented method of incrementally adding one or more documents to a k nearest neighbor database, said database including original documents, categories, category assignments for the original documents, and category scores for the original documents, the method including:

retaining for the original documents a first list of their k nearest neighbors and corresponding similarity scores;

retaining for the original documents a second list of m–k additional nearest neighbors and corresponding similarity scores;

adding one or more documents;

calculating similarity scores between the added documents, and the added and original documents;

modifying the retained first and second nearest neighbor lists for a predetermined number of nearest neighbors of the added documents;

adding category assignments for the added documents;

computing one or more category scores for the added documents and the predetermined number of nearest neighbors of the added documents, based on the retained and calculated similarity scores; and computing precision and recall curves for the categories to which the category assignments are added.

5. A computer-implemented method of incrementally deleting category assignments from particular documents in a k nearest neighbor database, said database including original documents, categories, category assignments for the original documents, and category scores for the original documents, the method including:

retaining for the original documents a first list of their k nearest neighbors and corresponding similarity scores;

retaining for the original documents a second list of m–k additional nearest neighbors and corresponding similarity scores;

deleting one or more of the category assignments for one or more particular original documents;

computing category scores for the particular original documents and a predetermined number of nearest neighbors of the particular original documents, for those categories from which the category assignments are deleted, based on the retained similarity scores; and computing precision and recall curves for the categories from which the category assignments are deleted.

6. A computer-implemented method of incrementally deleting documents from a k nearest neighbor database, said database including original documents, categories, category assignments for the original documents, and category scores for the original documents, the method including:

retaining for the original documents a first list of their k nearest neighbors and corresponding similarity scores;

retaining for the original documents a second list of m–k additional nearest neighbors and corresponding similarity scores;

deleting one or more of the original documents and corresponding category assignments from the database;

deleting the deleted documents from the retained first and second nearest neighbor lists for a predetermined number of nearest neighbors of the deleted documents;

computing one or more category scores for a predetermined number of nearest neighbors of the deleted documents, based on the retained similarity scores; and computing precision and recall curves for the categories in which the deleted documents had category assignments.

7. A computer-implemented method of incrementally adding category assignments to particular original documents in a k nearest neighbor database, said database including original documents, categories, category assignments for the original documents, and category scores for the original documents, the method including:

retaining for the original documents a first list of their k nearest neighbors and corresponding similarity scores;

creating an influence list of original documents having a particular original document among their k nearest neighbors;

adding one or more category assignments for one or more particular original documents;

identifying influenced original documents from the influence list for the particular original documents to which the category assignments are added;

computing category scores of the influenced original documents and of the particular original documents, for those categories to which the category assignments are added, based on the retained similarity scores; and computing precision and recall curves for the categories to which the category assignments are added.

8. A computer-implemented method of incrementally adding one or more documents to a k nearest neighbor database, said database including original documents, categories, category assignments for the original documents, and category scores for the original documents, the method including:

retaining for the original documents a first list of their k nearest neighbors and corresponding similarity scores;

creating an influence list of those original documents having certain original documents among their k nearest neighbors;

adding one or more documents to the database;

calculating similarity scores between the added documents, and the added and original documents;

updating the retained first list of k nearest neighbors to include the added documents;

updating the influence list to include the added documents;

adding category assignments for the added documents;

computing one or more category scores of the added and original documents influenced by the category assignments, based on the retained and calculated similarity scores; and computing precision and recall curves for the categories to which the category-assignments are added.

9. A computer-implemented method of incrementally deleting category assignments from particular documents in a k nearest neighbor database, said database including original documents, categories, category assignments for the original documents, and category scores for the original documents, the method including:

retaining for the original documents a first list of their k nearest neighbors and corresponding similarity scores;

creating an influence list of those original documents having certain original documents among their k nearest neighbors;

deleting one or more category assignments for one or more particular original documents;

identifying influenced original documents from the influence list for the particular original documents from which the category assignments are deleted;

computing category scores of the influenced original documents and of the particular original documents for those categories from which the category assignments are deleted, based on the retained similarity scores; and computing precision and recall curves for the categories from which the category assignments are deleted.

10. A computer-implemented method of incrementally deleting one or more documents to a k nearest neighbor database, said database including original documents, categories, category assignments for the original documents, and category scores for the original documents, the method including:

retaining for the original documents a first list of their k nearest neighbors and corresponding similarity scores;

retaining for the original documents a second list of m–k additional nearest neighbors and corresponding similarity scores;

creating an influence list of those original documents having certain original documents among their k nearest neighbors;

deleting one or more documents from the database and corresponding category assignments;

updating the retained first and second lists of m nearest neighbors to delete the deleted documents;

updating the influence list to delete the deleted documents;

computing one or more category scores of the original documents influenced by the deleted documents, based on the retained similarity scores; and computing precision and recall curves for the categories in which the deleted documents had category assignments.

* * * * *